US012659559B2

(12) United States Patent
Liang et al.

(10) Patent No.: US 12,659,559 B2
(45) Date of Patent: Jun. 16, 2026

(54) HYPERSPECTRAL RECOVERY FROM TWO IMAGES

(71) Applicant: Arizona Board of Regents on Behalf of the University of Arizona, Tucson, AZ (US)

(72) Inventors: Rongguang Liang, Tucson, AZ (US); Yuanyuan Sun, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 0 days.

(21) Appl. No.: 18/842,158

(22) PCT Filed: Feb. 28, 2023

(86) PCT No.: PCT/US2023/014076
§ 371 (c)(1),
(2) Date: Aug. 28, 2024

(87) PCT Pub. No.: WO2023/164271
PCT Pub. Date: Aug. 31, 2023

(65) Prior Publication Data
US 2025/0184584 A1 Jun. 5, 2025

Related U.S. Application Data

(60) Provisional application No. 63/314,566, filed on Feb. 28, 2022.

(51) Int. Cl.
| | |
|---|---|
| *H04N 5/335* | (2011.01) |
| *G06T 7/00* | (2017.01) |
(Continued)

(52) U.S. Cl.
CPC ........... *H04N 23/16* (2023.01); *G06T 7/0002* (2013.01); *H04N 23/45* (2023.01); *H04N 23/56* (2023.01);
(Continued)

(58) Field of Classification Search
CPC ............................................... G01J 2003/2826
See application file for complete search history.

(56) References Cited

U.S. PATENT DOCUMENTS

| | | | | |
|---|---|---|---|---|
| 2006/0279647 A1* | 12/2006 | Wada | ..................... | H04N 23/10 |
| | | | | 348/272 |
| 2012/0044394 A1* | 2/2012 | Komiya | ............... | H04N 25/445 |
| | | | | 348/E9.003 |
(Continued)

FOREIGN PATENT DOCUMENTS

WO      2021171905 A1      9/2021

OTHER PUBLICATIONS

Arad et al. "Sparse Recovery of Hyperspectral Signal from Natural RGB images." European Conference on Computer Vision, 2016, Part VII, LNCS 9911, Springer International Publishing AG, pp. 19-34.
(Continued)

*Primary Examiner* — Gary C Vieaux
(74) *Attorney, Agent, or Firm* — Perkins Coie

(57) ABSTRACT

Hyperspectral imaging methods, devices and systems are described that improve the hyperspectral accuracy, and reduce manufacturing costs, by using two images that enable the recovery of hyperspectral images with high fidelity. One hyperspectral imaging device includes one or more imaging lenses, one or more sensors positioned to receive light associated with an object from the one or more imaging lenses, and a spectral filter. The hyperspectral imaging device is configured to capture a first image produced
(Continued)

without using the spectral filer and to capture a second image produced with the spectral filter. The first image and the second image have different spectral contents, and the first and the second images are processed using a trained neural network for producing hyperspectral imaging data associated with the first and second images.

26 Claims, 12 Drawing Sheets

(51) Int. Cl.

| | |
|---|---|
| *H04N 23/16* | (2023.01) |
| *H04N 23/45* | (2023.01) |
| *H04N 23/56* | (2023.01) |
| *H04N 23/74* | (2023.01) |
| *H04N 23/84* | (2023.01) |

(52) U.S. Cl.
CPC ............. *H04N 23/74* (2023.01); *H04N 23/84* (2023.01); *G06T 2207/10024* (2013.01); *G06T 2207/20081* (2013.01); *G06T 2207/20084* (2013.01)

(56) References Cited

U.S. PATENT DOCUMENTS

| | | | |
|---|---|---|---|
| 2020/0088580 A1* | 3/2020 | Darty | G01J 3/36 |
| 2020/0302249 A1* | 9/2020 | Liu | G06F 18/214 |
| 2020/0345284 A1 | 11/2020 | Tao et al. | |

OTHER PUBLICATIONS

Arad et al. "Filter Selection for Hyperspectral Estimation," In Proceedings of the IEEE International Conference on Computer Vision, 2017, pp. 3153-3161.

Fu et a "Joint Camera Spectral Sensitivity Selection and Hyperspectral Image Recovery," In Proceedings of the European Conference on Computer Vision (ECCV), 2018, pp. 788-804.

Guolan et al. "Medical hyperspectral imaging: a review," Journal of Biomedical Optics, Jan. 2014, 19(1) (2014): 010901-1-23 (24 pages).

Hagen et al. "Review of snapshot spectral imaging technologies." Optical Engineering, Sep. 2013, 52(9):090901-1-23 (24 pages).

Huang et al. "Densely connected convolutional networks," In Proceedings of the IEEE conference on computer vision and pattern recognition, 2017, pp. 4700-4708.

Kingma et al. "Adam: A Method for Stochastic Optimization," ICLR 2015, arXiv preprint arXiv:1412.6980, (15 pages).

Li et al. "HSVCNN: CNN-based Hyperspectral Reconstruction from RGB Videos." 25th IEEE International Conference on Image Processing (ICIP) Oct. 2018, pp. 3323-3327.

Nie et al. "Deeply learned filter response functions for hyperspectral reconstruction," In Proceedings of the IEEE Conference on Computer Vision and Pattern Recognition, 2018, pp. 4767-4776.

Ozkan et al. "Endnet: Sparse Autoencoder Network for Endmember Extraction and Hyperspectral Unmixing." IEEE Transactions on Geoscience and Remote Sensing, Jan. 2019, 57(1): 482-496.

Shi et al. "HSCNN+: Advanced CNN-based Hyperspectral Recovery from RGB Images," In Proceedings of the IEEE Conference on Computer Vision and Pattern Recognition Workshops, 2018, pp. 1052-1060.

Sun et al. "Color polarization demosaicking by a convolutional neural network," Optics Letters, Sep. 2021, 46(17):4338-4341.

Yang et al. "Hyperspectral Image Classification with Deep Learning Models," IEEE Transactions on Geoscience and Remote Sensing, Sep. 2018, 56(9):5408-5423.

Zhang et al. "Deep-learning-based hyperspectral recovery from a single RGB image," Optics letters, Oct. 15, 2020, 45(20), 5676-5679.

International Search Report and Written Opinion for PCT Application No. PCT/US2023/014076 dated Jun. 8, 2023.

* cited by examiner

HYPERSPECTRAL RECOVERY FROM TWO IMAGES

CROSS REFERENCE TO RELATED APPLICATION(S)

This patent document is a 371 National Stage Application of International Patent Application No. PCT/US2023/014076, filed on Feb. 28, 2023, which claims priority to the provisional application with Ser. No. 63/314,566 titled "HYPERSPECTRAL RECOVERY FROM TWO IMAGES," filed Feb. 28, 2022. The entire contents of the above noted applications are incorporated by reference as part of the disclosure of this document.

TECHNICAL FIELD

The disclosed technology relates to methods and devices for producing hyperspectral images.

BACKGROUND

Hyperspectral imaging (HSI), which has been widely applied in biomedical imaging, remote sensing, computer vision and other fields, obtains two-dimensional images across a multitude of wavelengths. In particular, the spectrum is divided into many bands that often extend beyond the visible spectrum. The measured spectra have fine wavelength resolution that can be used to identify objects or features of interest that may otherwise not be detected. Various HSI systems have been developed to obtain the three-dimensional (x, y, λ) dataset of a hyperspectral cube, where x and y correspond to spatial coordinates and λ corresponds to the spectral wavelength. Conventional approaches often cannot achieve high spatial, spectral, and temporal resolutions, may not be suitable for making dynamic measurements, are computationally expensive, and have a high cost of manufacturing. Therefore, there is a need for improved hyperspectral imaging techniques.

SUMMARY

The disclosed embodiments relate to methods, devices and systems that utilize two images of an object to enable hyperspectral recovery of image data with increased fidelity. One example hyperspectral imaging device includes an imaging lens, a sensor positioned to receive light associated with an object from the imaging lens, and an illumination source configurable to produce illumination with changeable spectral characteristics. The hyperspectral imaging device is configured to capture a first image of the object using a first illumination output from the illumination source, and to capture a second image of the object using a second illumination output from the illumination source. The first and second illumination outputs have different spectral characteristics, and the first and second images are provided to a processor configured to process information associated with the first and the second images using a trained neural network for producing hyperspectral imaging data associated with the first and second images.

DETAILED DESCRIPTION

Figure 1B:
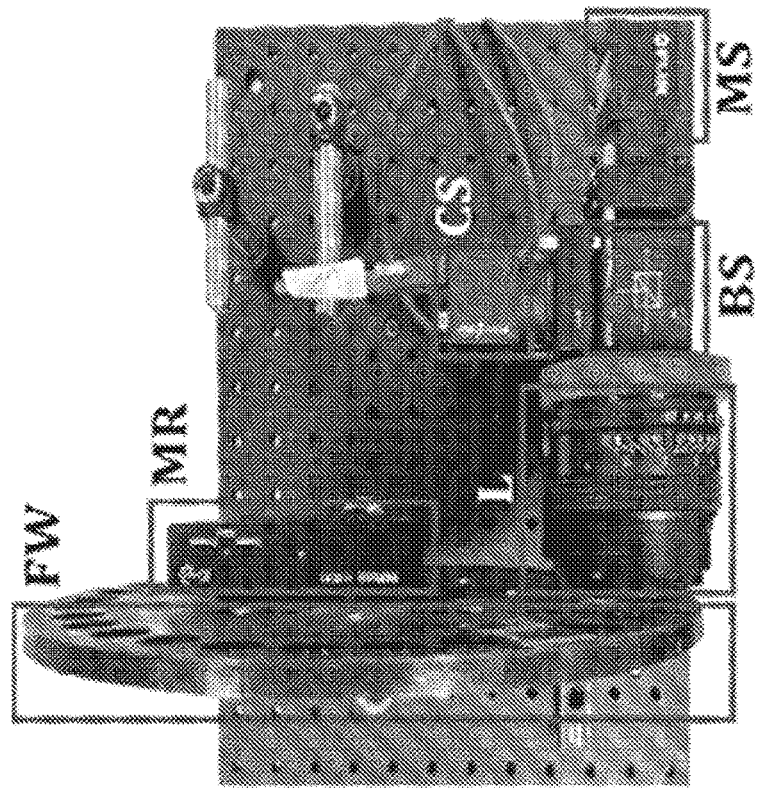
FIG. 1B illustrates a benchtop prototype of the HIS system of FIG. 1A.

As noted earlier, conventional HIS approaches often produce results by compromising spatial, spectral, and/or temporal resolutions. Some scanning HSI systems can obtain full-resolution hyperspectral images by spatially or spectrally scanning the object. However, such scanning mechanisms eliminate the possibility of dynamic measurements. Alternatively, snapshot HSI systems are able to capture dynamic events, but suffer severe tradeoffs between spectral and spatial resolutions. In recent years, computational hyperspectral recovery from RGB images has drawn much attention because it enables dynamic measurement without sacrificing spatial or spectral resolution. In some systems, based on the sparsity of the hyperspectral prior, a sparse coding method is implemented to depict the mapping between the hyperspectral signature and its RGB projection. One proposed system includes a hyperspectral recovery network (HSCNN) which utilizes a convolutional neural network (CNN) to learn the hypercube from a spectrally up-sampled data. Two advanced versions (collectively named HSCNN+) introduce residual blocks and dense blocks which deepen the HSCNN+ structures and boost the performance. Another technique uses a hyperspectral recovery network having a single dense block with fewer convolution layers to save computational power and maintain accuracy. However, existing methods, among other short-comings, tend to show worse performance at short and long wavelengths. The predictions around red and blue bands still need to be improved.

The selection of color filter array (CFA), which decides how the hyperspectral signature is projected to the RGB space, has also attracted some attention in hyperspectral recovery. In one system, based on an exhaustive search among commercial cameras, an optical CFA is identified. A learning-based model has also been proposed to choose the best CFA among the many candidates. Other techniques utilize a network to learn the optimal CFA and realize hyperspectral recovery. However, the cost of manufacturing the optimal CFA hinders the real application of the above methods.

The disclosed embodiments, address the shortcomings of the prior systems, improve the hyperspectral accuracy, and reduce the manufacturing cost, by using two images that enable the recovery of hyperspectral images with high fidelity. According to some embodiments, a pairwise-image-based hyperspectral convolutional neural network (pH-SCNN) is used to recover hyperspectral images from a pair of red, green and blue (RGB) images. The images may be captured sequentially by a sensor (e.g., a color sensor) with and without an optical filter in the imaging path (e.g., in front of the imaging lens). Alternatively, or additionally, the color filter may be used in the illumination path. In some embodiments, a tunable (wavelength-selective) light source may be utilized. Accordingly, the disclosed embodiments can be implemented to obtain a pair of RGB images with and without modifying the illumination spectrum. The disclosed pHSCNN can also optimize the optical filter to further improve the system performance. One example configuration uses a dual-camera hyperspectral imaging system. Using this configuration, a real-captured hyperspectral-RGB dataset is obtained to train and validate the pHSCNN. Experimental results illustrate the superiority of the optimized filter and the accuracy of the recovered hyperspectral signature compared to the conventional systems.

In some embodiments, the first RGB image is captured by a color sensor and the second is from the same sensor with an optimized filter ($F_{opt}$) in front of the imaging lens. The pHSCNN achieves hyperspectral recovery and filter optimization simultaneously. To train and validate the pHSCNN on real-captured images, we built a dual-camera hyperspectral system (FIGS. 1A and 1B) to capture hyperspectral-RGB image pairs. Due to the cost of manufacturing, $F_{opt}$, we tested the performance of the pHSCNN using commercial filters.

Figure 1A:
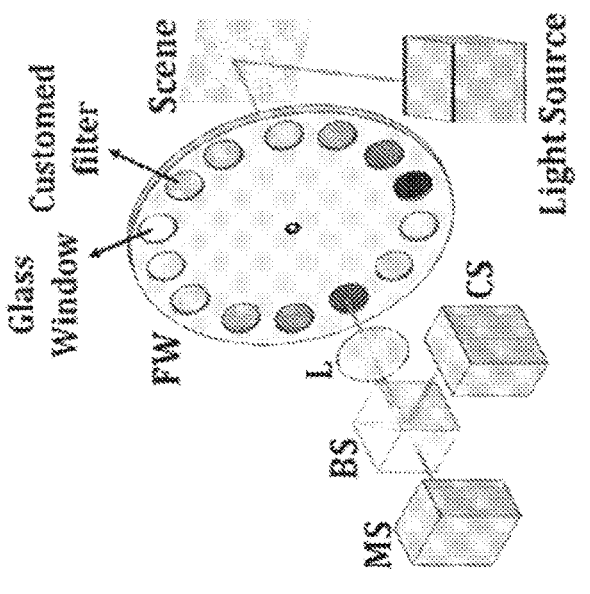
FIG. 1A illustrates an optical layout of a dual-camera hyperspectral imaging (HIS) system that uses a filter wheel in accordance with an example embodiment.

FIG. 1A illustrates the optical layout of an example dual-camera HSI system with a filter wheel. FIG. 1B illustrates a benchtop prototype of the HIS system. In FIGS. 1A and 1B, FW designates a filter wheel, BS a beam splitter, CS a color sensor, L an imaging lens, MR a motorized rotator and MS a monochromatic sensor. A wideband spectral light source is used to illuminate the object (scene), and the reflected light from the object passes through the filter that is placed in front of the imaging lens. The light is then captured by the color sensor and/or the monochromatic sensor. There are three kinds of filters on the wheel: one or more bandpass filters (e.g., the customize filter illustrated in example configuration of FIG. 1A), a glass window and commercial filters (in the example configuration of FIG. 1A, these are shown as 12 small circular filters on the fly wheel without text identifiers). A bandpass filter truncates the incident light within the transmission band and the trans-mitted light is collected by the monochromatic sensor after passing through the imaging lens and beam splitter. This gives hyperspectral ground-truth image. More specifically, in capturing the ground-truth image, the color wheel is rotated and the corresponding sensed light is recorded. The number and/or spectral resolution of the recorded spectral bands can be increased by increasing the number of band-pass filters and/or modifying their passbands. One of the positions on the wheel includes a glass window, which is used for capturing a standard RGB image. Light passing through the glass window experiences no spectral filtering and is captured by the color sensor after reflection by the beam splitter as the first RGB image. The reason to utilize a glass window, instead of leaving it empty, is to compensate for the optical path difference. The commercial filters are installed for capturing spectrally filtered RGB images, i.e., the second image, as will be explained below. FIG. 1B illustrates an experimental set up of the system, in which the rotation of the wheel is implemented by a motorized rotator (Thorlabs ELL14 rotation mount). A plate positioner (Thor-labs SPT1/M-XY slip Plate Positioner) is utilized to mount the color sensor (Blackfly S BFS-U3-51S5C) which gives a better alignment between the color sensor and the mono-chromatic sensor (Blackfly S BFS-U3-51S5M).

To facilitate the understanding of the disclosed embodi-ments, let's denote H to represent the hyperspectral ground-truth, and I to represent the RGB image. The two are related by:

$$I_c(x, y) = \sum_i H(x, y, i) * r_c(i) + N$$

where (x, y) represents the Cartesian coordinates. $c \in \{R, G, B\}$ and $i \in \{440 \text{ nm}, 450 \text{ nm}, \ldots, 670 \text{ nm}\}$ denote the RGB and hyperspectral channels separately. $r_c$ describes the cam-era's spectral response of channel c, and N denotes the noise. It should be noted that the above-described number and widths of spectral bands are provided by the way of example, and not by limitation. Reconstructing H from I is a severely ill-posed problem. Theoretically, the more RGB images captured under different conditions are used, the more accurate the estimation $\hat{H}$ is. However, capturing more images indicates a more complicated system with more cameras or longer time needed to capture images sequen-tially under different conditions. To minimize the number of images needed to recover accurate hyperspectral informa-tion, each image should provide unique spectral information. Such images can be captured either with different illumina-tion conditions or with different imaging conditions. Various methods, such as filters or tunable light source, can be used in illumination path to change the spectrum. In imaging path, filters can be placed in front of the imaging lens to obtain images with different spectral information.

In one example configuration, we employed a thin film filter in front of the imaging system to manipulate spectral transmission and generate a filtered RGB image $I^f$ which takes the form of:

$$I_c^f(x, y) = \sum_i H(x, y, i) * f(i) * r_c(i) + N$$

where f describes the filter spectral transmittance and * represents the convolution operation. The estimation accu-racy can be effectively enhanced by optimizing the filter f.

Figure 2A:
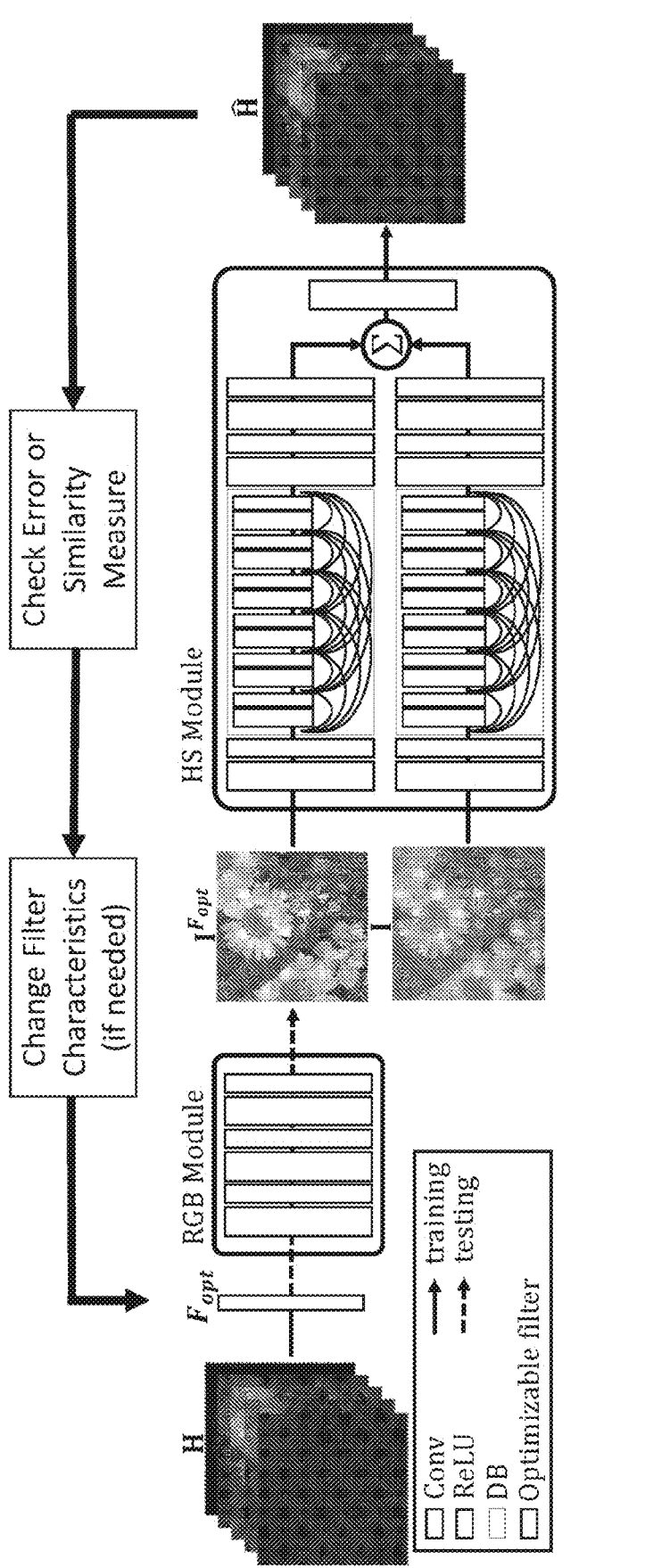
in FIG. 2A illustrates a neural network structure that can be used for training and filter optimization in an HSI system in accordance with an example embodiment.
Figure 2B:
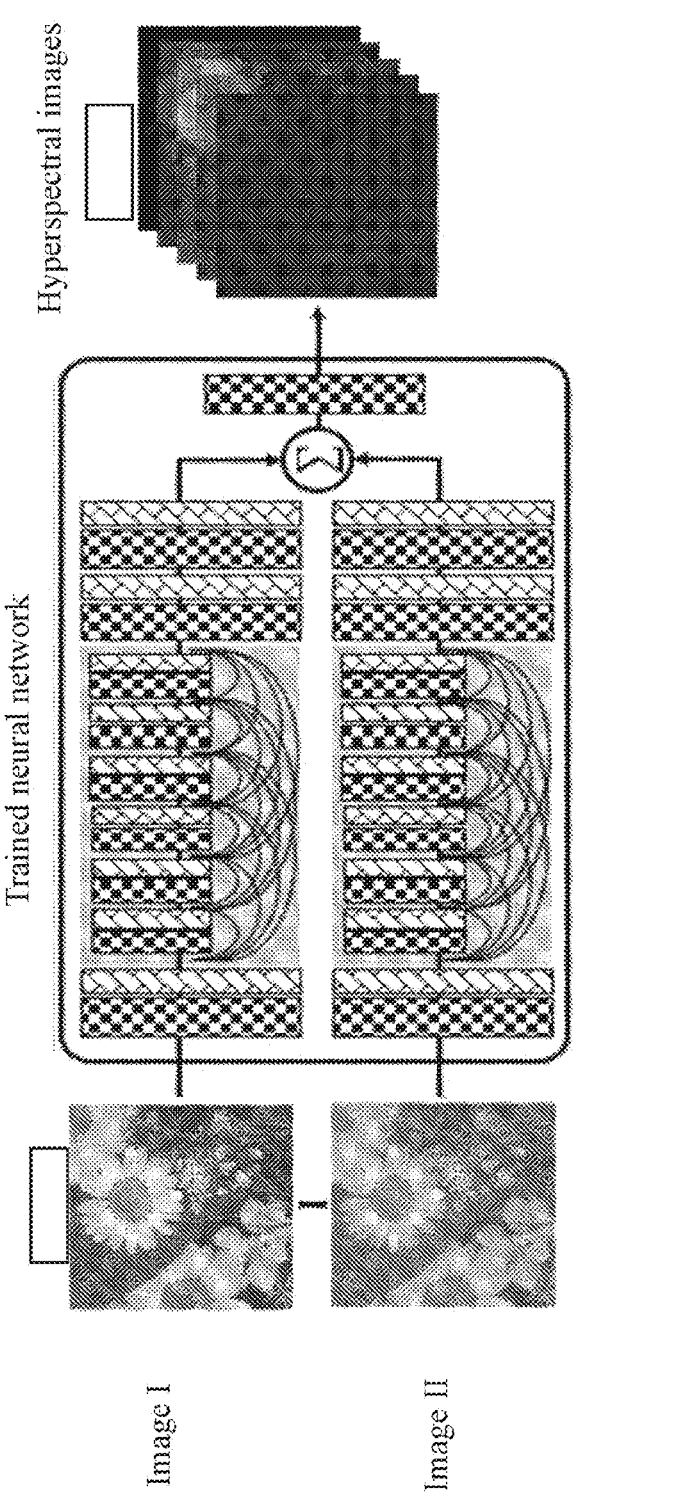
FIG. 2B illustrates a trained network of an HIS system produced using the configuration of FIG. 2A in accordance with an example embodiment.

In some embodiments, a CNN-based network, such as pHSCNN is used which achieves filter optimization and hyperspectral recovery simultaneously. The network structure is illustrated in FIG. 2A. The process entails training the neural network using the captured images while simultaneously determining the optimum (or the suitable candidate) filter characteristics. The trained network and optimized filter can subsequently be used to produce hyperspectral images for a variety of objects using only two images, as illustrated in FIG. 2B. It should be noted that the training and determination of filter characteristics can be repeated to accommodate different applications. For example, a trained network and associated filter that is used for endoscopy imaging applications may not be suitable for other applications, such as for producing hyperspectral images of the skin, or images of outdoor scenes such as vegetation, natural terrain and the like. Accordingly, the above noted procedures may need to be repeated for different applications in order to produce the properly trained neural network and the associated (optimized) filter.

Referring back to FIG. 2A, pHSCNN includes HS and RGB modules. The HS module outputs a hyperspectral prediction (or estimate) $\hat{H}$ from a pair of RGB images {I, $I^{F_{opt}}$} by learning the optimal projections from low-dimensional RGB space to high-dimensional hyperspectral space. Both I and $I^{F_{opt}}$ first undergo the same layers to extract feature maps separately and these feature maps are combined on a pixel basis. Then these feature maps are projected into hypercube based on the learned projection in the HS module. In one example implementation, I or $I^{F_{opt}}$ is first passed through a convolutional (Conv) layer with 16 filters followed by a rectified linear unit (ReLU) activation function. The output is fed into a dense block (DB) consisting of 6 Conv layers. Every layer in DB takes all the preceding outcomes as input and concatenates the previous and new outputs together. The stacked feature maps are passed through two Conv layers with 112 and 64 filters. The intermediate outputs from I and $I^{F_{opt}}$ are summed together pixel-to-pixel and then fed into the last Conv layer with 24 filters to give the correct dimension. The RGB module learns the mapping relationship from high-dimensional hyperspectral space to low-dimensional RGB space and converts the hyperspectral image cube into an RGB image. In the example configuration, it consists of three Conv layers containing 12, 6 and 3 filters sequentially and each is followed by a ReLU activation function. It is pre-trained using pairwise hyperspectral and RGB images. The hypercube H is multiplied by the optimizable filter $F_{opt}$ and passed into the pre-trained RGB module to generate $I^{F_{opt}}$.

During training, root mean squared error (RMSE), mean absolute error (MAE) and structure similarity index (SSIM) are utilized in loss function. The loss function for HS module can be written as $$\text{loss}_{HS}\left(\hat{H}, H\right) = \left\|\hat{H} - H\right\|_2 + \left\|\hat{H} - H\right\|_1 + \lambda \sum_i ssim\left(\hat{H}_i, H_i\right)$$

where $\lambda$ balances the weight of SSIM component. The loss function for the RGB module takes a similar form. In one example, the real-captured dataset included 60 scenes, mainly of colorful dried flowers and paintings. Every scene contained an RGB image and a hypercube ranging from 440 nm to 670 nm with 10 nm bandwidth. 45 out of 60 scenes were selected as training samples and were cropped into small patches of size 40×40. The total patch number for training was 134976. We chose the Adam optimizer with batch size of 64 and epoch number of 100. The learning rate was initially set to 0.001 and exponentially decayed with a rate of 0.99. It should be noted that other optimization techniques can be used, including but not limited to stochastic descent, adaptive gradient, root-mean-square propagation and the like. As part of the simultaneous training and filter design, the loss function, error function, similarity measure, or another error criterion is assessed, and if the error or loss measure has not reached a predetermined level, the filter characteristics are modified, and the operations are repeated.

Figure 3:
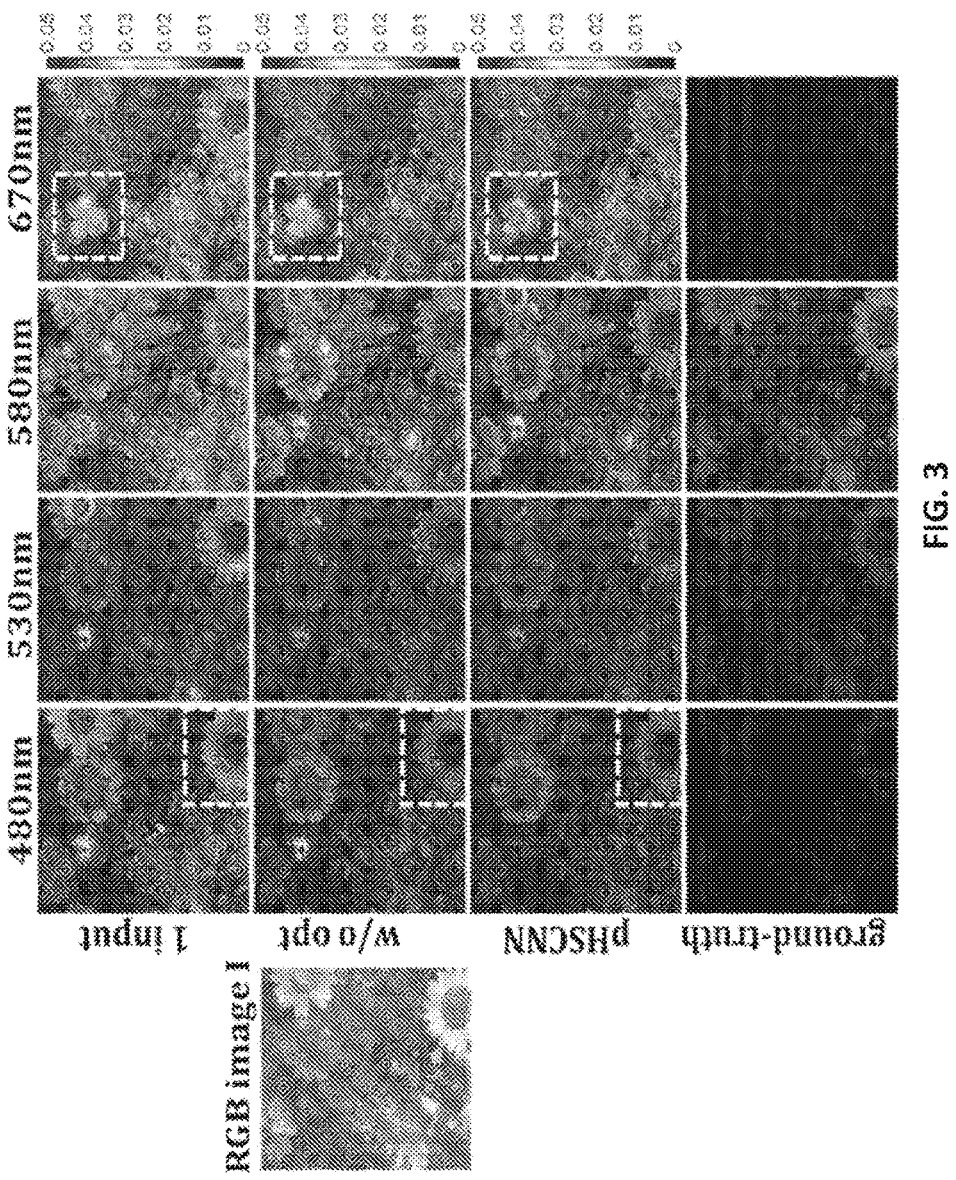
FIG. 3 shows example spectral difference maps between the recovered hyperspectral image and ground truth image using three models at four selected wavelengths.
Figure 4:
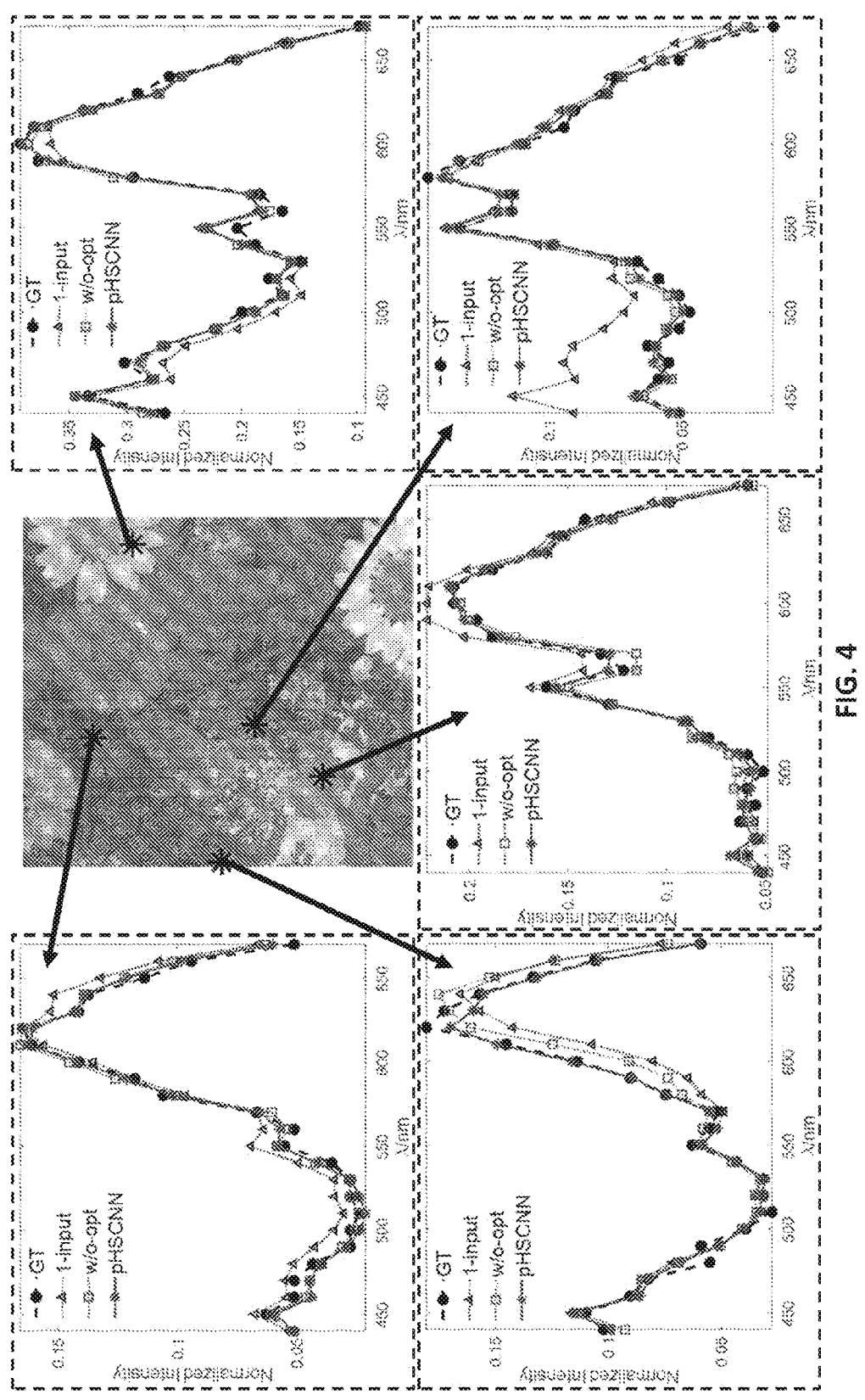
FIG. 4 illustrates plots of normalized intensity versus wavelength for selected points of an example image obtained via the same four techniques described in connection with FIG. 3.

FIG. 3 shows example spectral difference maps between the recovered hyperspectral image and ground truth image using three models at four selected wavelengths. The first row demonstrates the results from a previous model that uses only the first RGB image I (termed 1 input). Without the extra information brought by $I^{F_{opt}}$, the reconstruction from model with 1 input suffers greater error, especially on the red and white flower (yellow boxed areas). Both the second and third rows represent models with two RGB inputs. The difference is whether filter optimization is included or not. The second row demonstrates results from pHSCNN without filter optimization (termed w/o opt). In practice, the optimizable filter was frozen and replaced by a transmittance curve with slow variation. Model w/o opt is implemented as an ablation experiment to emphasize the advantage of filter optimization. Although model w/o opt corrects some misinterpretations in model with 1 input, it shows larger deviation from the ground-truth than pHSCNN with optimization, especially inside the dashed-boxed areas. The results indicate that the pairwise-input mechanism and the filter optimization in pHSCNN can greatly boost the performance of hyperspectral estimation. FIG. 4 illustrates plots of normalized intensity versus wavelength for selected points of an example image obtained via the same four techniques described in connection with FIG. 3. As shown in FIG. 4's full-band spectral response of five selected points, both model with 1 input and model w/o opt depart from the ground-truth with larger margin than pHSCNN.

Besides perceptual quality, numerical metrics are utilized to evaluate network performance. For example, spectral angle mapper (SAM), peak signal-to-noise ratio (PSNR) and SSIM can be employed. SSIM and PSNR evaluate the spatial similarity with higher values indicating better result. SAM accentuates the spectral resemblance with minor value representing higher spectral correlation, which takes the form of:

$$SAM\left(x, y\right) = \cos^{-1}\left(\frac{\sum_i H\left(x, y, i\right) \cdot \hat{H}\left(x, y, i\right)}{\sqrt{\sum_i \left|H\left(x, y, i\right)\right|^2 \sum_i \left|\hat{H}\left(x, y, i\right)\right|^2}}\right)$$

The averaged values of three metrics on validation images are listed in Table 1. The disclosed pHSCNN achieves a 3 dB improvement on PSNR, a 3.2% increase on SSIM and a 0.02 radians reduction on SAM compared to model 1-input. pHSCNN also shows significant improvements compared to the model w/o opt.

TABLE 1

| | | | |
|---|---|---|---|
| Numerical Results of Different Methods | | | |
| | SAM | PSNR | SSIM |
| 1-input | 0.099 | 34.251 | 0.910 |
| w/o opt | 0.080 | 36.988 | 0.936 |
| pHSCNN | 0.078 | 37.309 | 0.939 |

Figure 5:
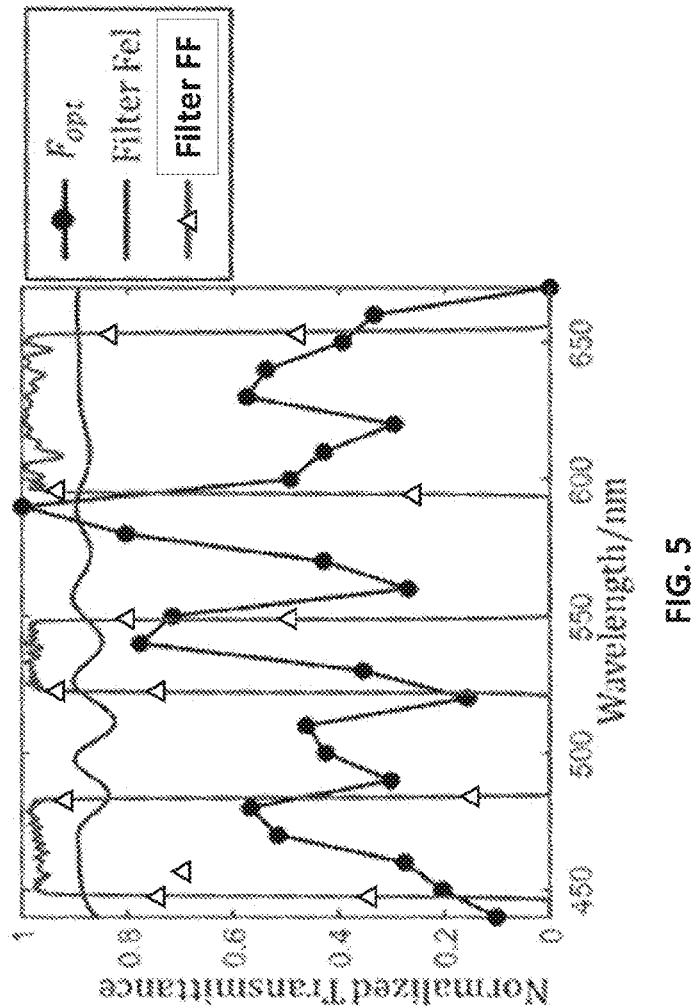
FIG. 5 illustrates normalized spectral transmittance of two commercial filters and an optimized filter in accordance with an example embodiment.

FIG. 5 illustrates normalized spectral transmittance of an optimized filter and two commercial filters. The example $F_{opt}$ (circles) is obtained using the above-described procedure. When training the pHSCNN, the only constraint on $F_{opt}$ was to take values which are nonnegative and upper bounded by one. The $F_{opt}$ obtained in this way shows severe zigzagging which poses great difficulty in fabricating an actual filter. Therefore, during the determination of $F_{opt}$ additional constraints may be imposed to produce filters that can be readily manufactured. For simplicity, we selected a commercial multi-band pass filter with transmission spectra which had similarities to $F_{opt}$ (termed Filter FF with triangles, such as Semrock bandpass filter FF01-465/537/623-25). A longpass filter with slightly varying spectral transmittance (termed Filter Fel, Thorlabs longpass filter #FEL0400) was also included for comparison. We collected the real-captured $I^{FF}$ and $I^{FEL}$ using the dual-camera HSI system and retrained the modified pHSCNN without the filter optimization and RGB module. The result of a selected scene is shown in the example plots of FIG. 6.

Figure 6:
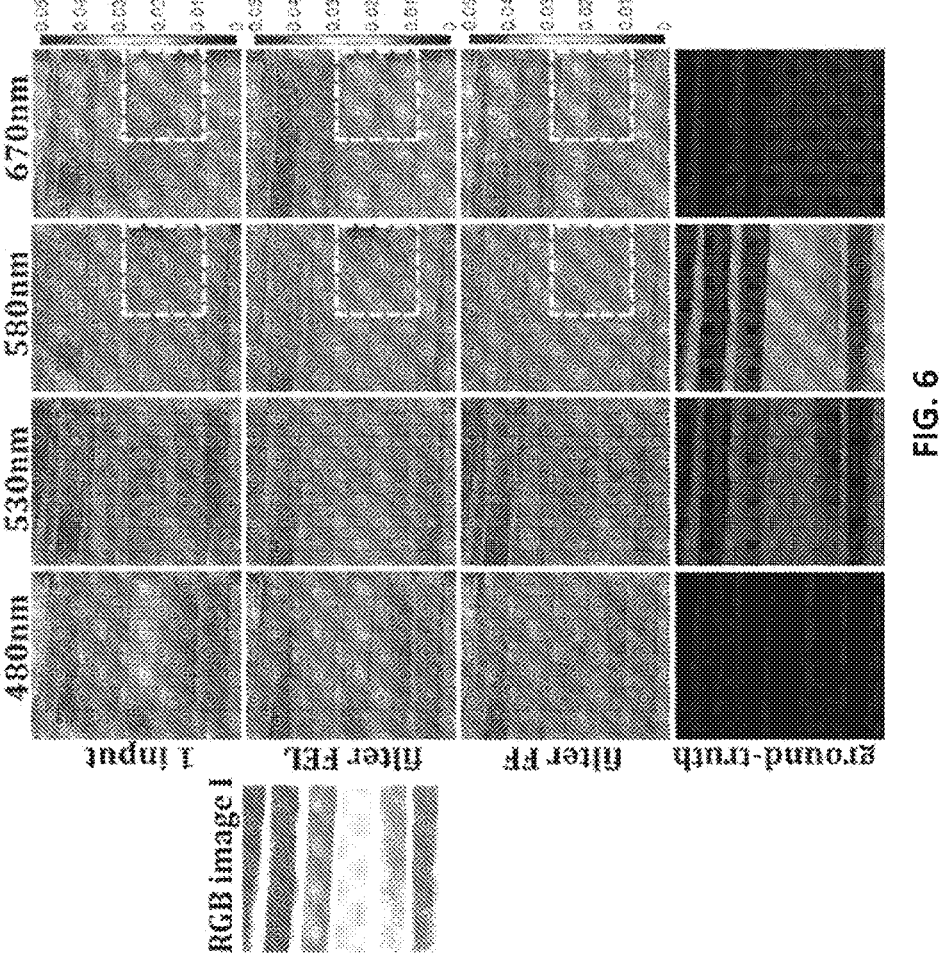
FIG. 6 shows example spectral difference maps between the recovered hyperspectral image and ground truth image at four selected wavelengths produced by two different filters and the single-input method.

As shown in FIG. 6, the result from the model with filter FF shows outstanding performance with negligible spectral difference on dashed-boxed areas while the model with 1-input and model with filter FEL almost fail. One possible reason is that the objects inside those dashed boxes are orange and yellow pigments which have higher intensities on wavelengths ranging from 550 nm to 650 nm. The experimental results suggest that the error is more prominent in the region of higher intensity, which explains why the model with 1 input exhibits the most significant difference on 580 nm and 670 nm. The filter FF features a sharp variation in transmitted spectrum, providing very different spectral features compared to standard RGB image. In contrast, the filter FEL shows a more evenly distributed transmitted spectrum over the entire working spectrum. As expected, the recovered spectral images from the model with filter FF exhibit much less errors. In 670 nm, the error is relatively large, but still smaller than other two models. The reason is that the image with filter FF doesn't provide additional information at 670 nm since the spectrum transmittance is almost zero around 670 nm.

In the above configuration, the disclosed pairwise-image-based hyperspectral convolutional neural network (pHSCNN) reconstructs hyperspectral signature from two RGB images $\{I, I^{F_{opt}}\}$ and outputs the optimal filter $F_{opt}$ simultaneously. Instead of using simulated RGB images, we built a dual-camera HSI system and obtained a real-captured hyperspectral-RGB dataset to train pHSCNN. Generally, the RGB images can be captured using a camera with an RGB color filter array. The ablation experiment without filter optimization emphasizes the superiority of the learned $F_{opt}$. The experimental results show that pHSCNN outperforms the conventional methods on perceptual quality and numerical metrics.

While in the above description, the accuracy improvement in recovering hyperspectral information can be sufficiently achieved from two different images, the results can be further improved with three images.

In the meantime, instead of optimizing the filter in the imaging path, we can also optimize and change the illumination spectrum to capture the additional images. This approach could be much more practical to implement in applications with active illumination.

Figure 7:
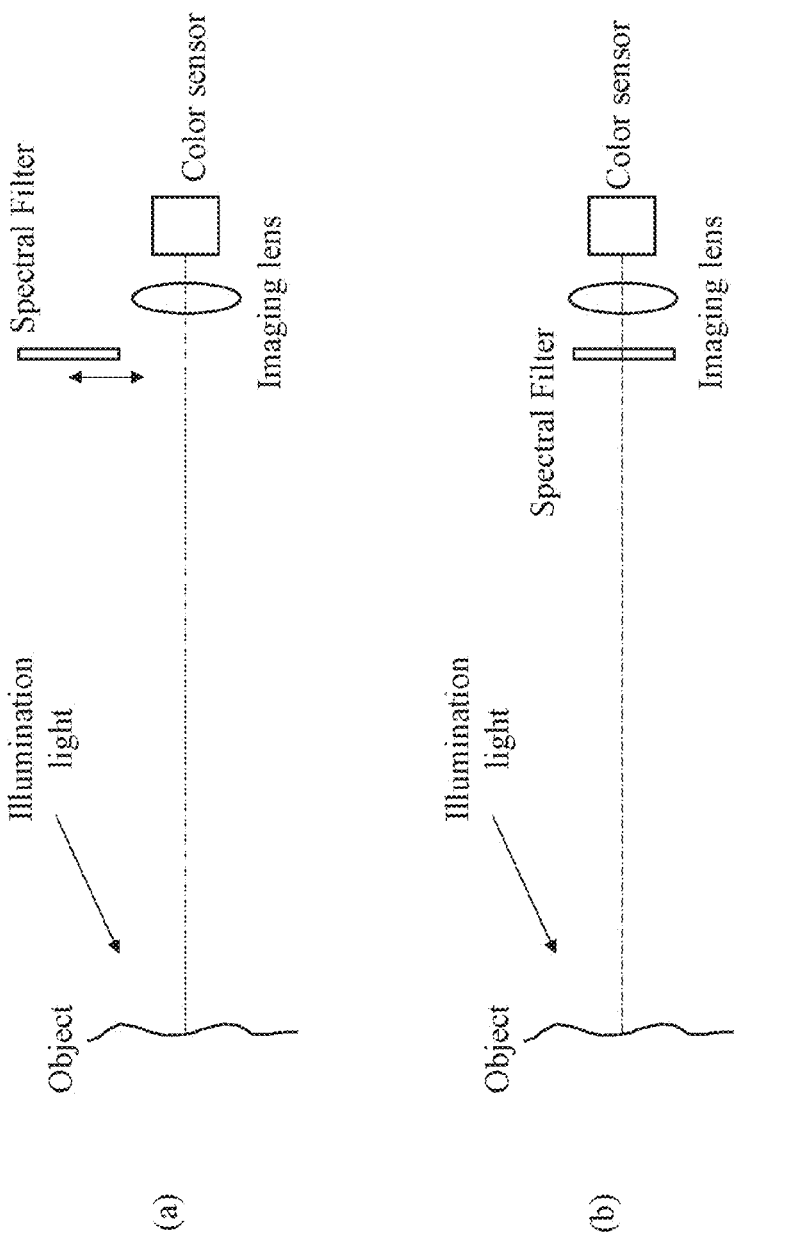
FIG. 7 illustrates a method and configuration for obtaining a hyperspectral image when the filter is positioned in the imaging path in accordance with some example embodiments.

FIG. 7 illustrates an example method and configuration for obtaining a hyperspectral image when the filter is positioned in the imaging path. In the example configuration of FIG. 7, the illumination light is reflected from the object. In the upper panel (a) of FIG. 7, the first image is captured without the spectral filter using the imaging lens and the color sensor. The spectral filter can be moved out of the imaging path (or completely removed from the system, when capturing the first image. The color sensor can be a typical sensor with RGB capture capability. In the lower panel (b) of FIG. 7, the filter is positioned in the imaging path in front of the imaging lens and a second image is captured.

Figure 8:
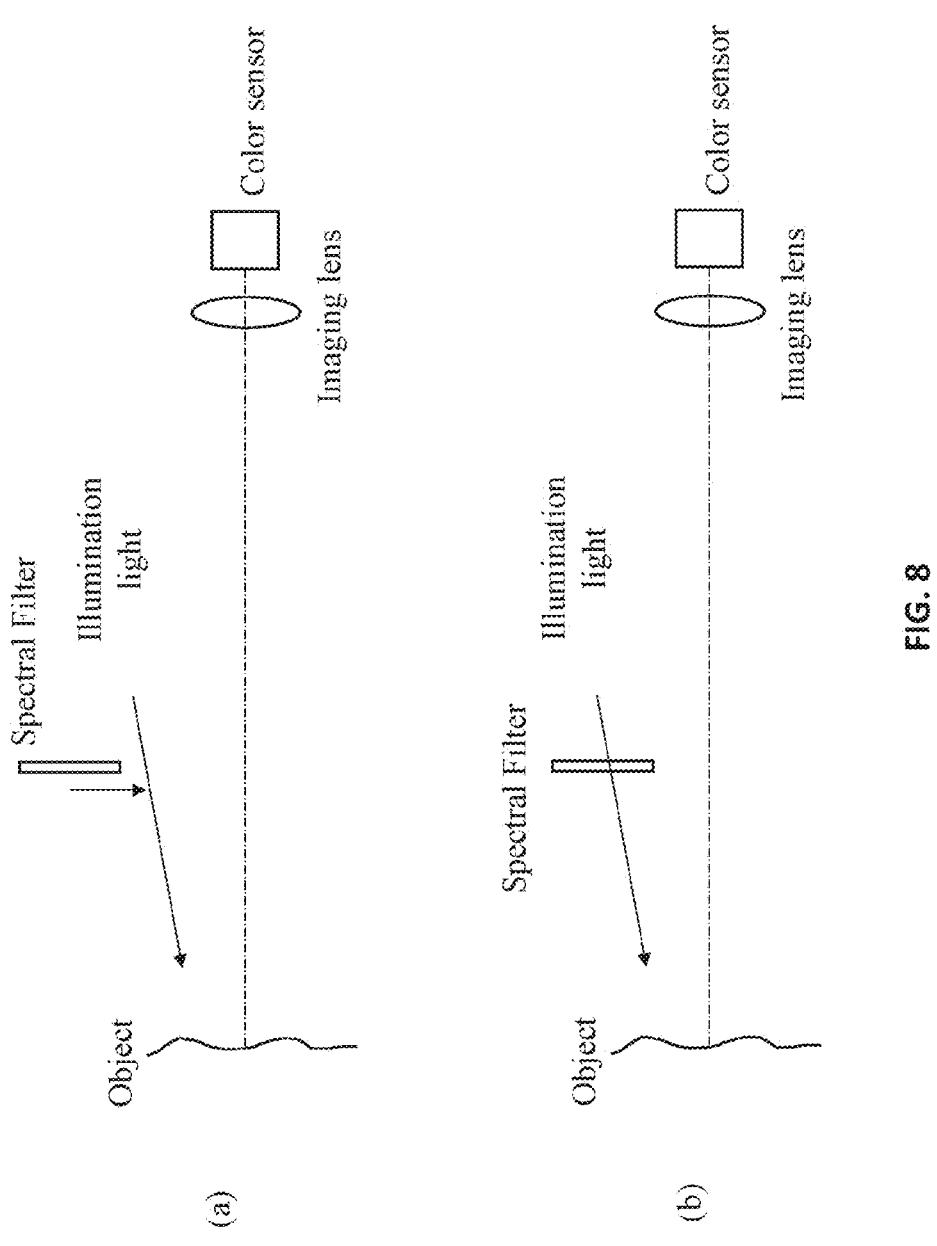
FIG. 8 illustrates a method and configuration for obtaining a hyperspectral image when the filter is positioned in the illumination path in accordance with some example embodiments.

FIG. 8 illustrates an example method and configuration for obtaining a hyperspectral image when the filter is positioned in the illumination path. In the example configuration of FIG. 8, the illumination light is reflected from the object without the filter obstructing the illumination path, as shown in the upper panel (a). The first image is captured from the light that is reflected from the object using the imaging lens and the color sensor. In the lower panel (b) of FIG. 8, the filter is positioned in the illumination path (between the light source and the object) and a second image is captured from the filtered light that is reflected from the object.

As noted earlier, for some applications it may be more convenient to position the filter in the illumination path. For example, in endoscopy applications it may be more practical to position a removable filter in the illumination path as opposed to the imaging path because of a lack of accessibility to the imaging path. On the other hand, in applications where an ambient light source is used (e.g., sunlight, room lighting, etc.) filtering the illumination light may not be possible or practical, and thus it may be more convenient to position the filter in the imaging path. Furthermore, in some embodiments, two filters, one positioned in the illumination path and another positioned in the imaging path, can be used. The optimization process is similar to the ones described in connection with the previously described configurations, but the filter optimization is carried out jointly for the two filters. The two-filter configuration can be helpful in, for example, scenarios where manufacturing of a single optimized filter is not feasible.

Figure 9:
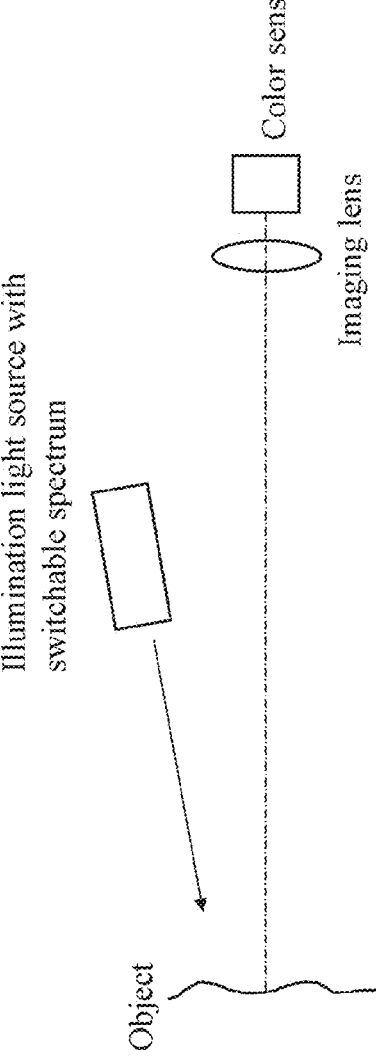
FIG. 9 illustrates a method and configuration for obtaining a hyperspectral image when spectrum of the illumination source is changed for capturing the two images in accordance with some example embodiments.

FIG. 9 illustrates an example method and configuration for obtaining a hyperspectral image when spectrum of the illumination source is changed for capturing the two images. In the example configuration of FIG. 9, the illumination source is configured to emit radiation with a first spectral content while the first image is captured. The illumination source is next configured to emit radiation with a second spectral content while the second image is captured. Using the two images, a hyperspectral image is produced, as described earlier in this patent document. Examples implementations for the light source include (a) a tunable light source, such as a tunable laser, (b) an array of light sources, such as LEDs where the spectrum is switched by controlling the ON/OFF configuration of the different LEDs, or by changing the driving current for each LED, (c) movable/changeable filters that can be placed (and removed) in front of broadband light source, or (d) a light source with a spatial light modulator, such as a digital mirror device (DMD) or a liquid crystal spatial light modulator, to modulate the illumination spectrum.

Figure 10:
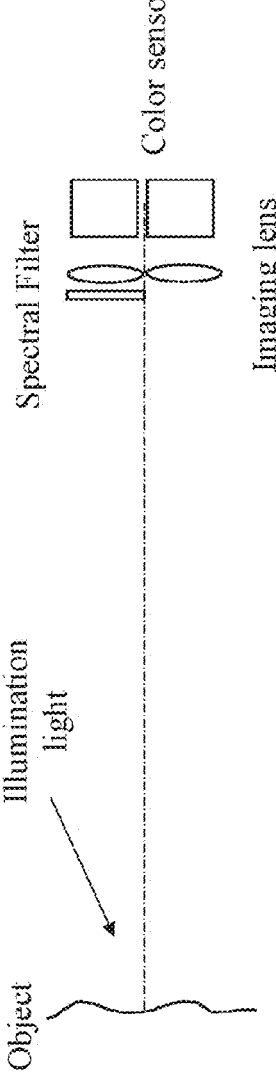
FIG. 10 illustrates another method and configuration for obtaining a hyperspectral image in accordance with some example embodiments.

FIG. 10 illustrates an example method and configuration for obtaining a hyperspectral image according to an alternate embodiment. In the configuration of FIG. 10, the two images are captured simultaneously. In particular, two imaging systems can be implemented. The first imaging system includes a first imaging lens, which is used to capture the first image (without a filter). The second imaging system includes a second imaging lens and a filter, which is used to capture the second image. Different sections of a color sensor (if large enough to accommodate both images) can be used to capture the two images simultaneously. Alternatively, two separate color sensors may be used, one for each image. The two imaging lenses are preferably positioned close to each other (e.g., one above and one below the optical axis of the system) to accommodate imaging of substantially the same areas of the image (i.e., having large overlaps in their fields of view).

The disclosed imaging systems enable the recovery of hyperspectral images with 10 nm or less bandwidth from two color images using a deep learning system at a better resolution compared to systems that use a single image. The system also outperforms traditional hyperspectral imaging systems that are more complicated and require capturing of many more images to achieve a suitable resolution. In an example process, the first image is captured with a commonly used illumination spectrum for the targeted application, and the second image is captured with a modified spectrum which will maximize the accuracy of recovered hyperspectral images. The spectrum for the second image can be modified by using a spectral filter in the illumination or imaging paths. The transmitted spectrum of the spectral filter is optimized for maximizing the accuracy of the recovered spectral information. The illumination spectra for two images should be optimized to maximize the accuracy in recovering the hyperspectral information.

Figure 11:
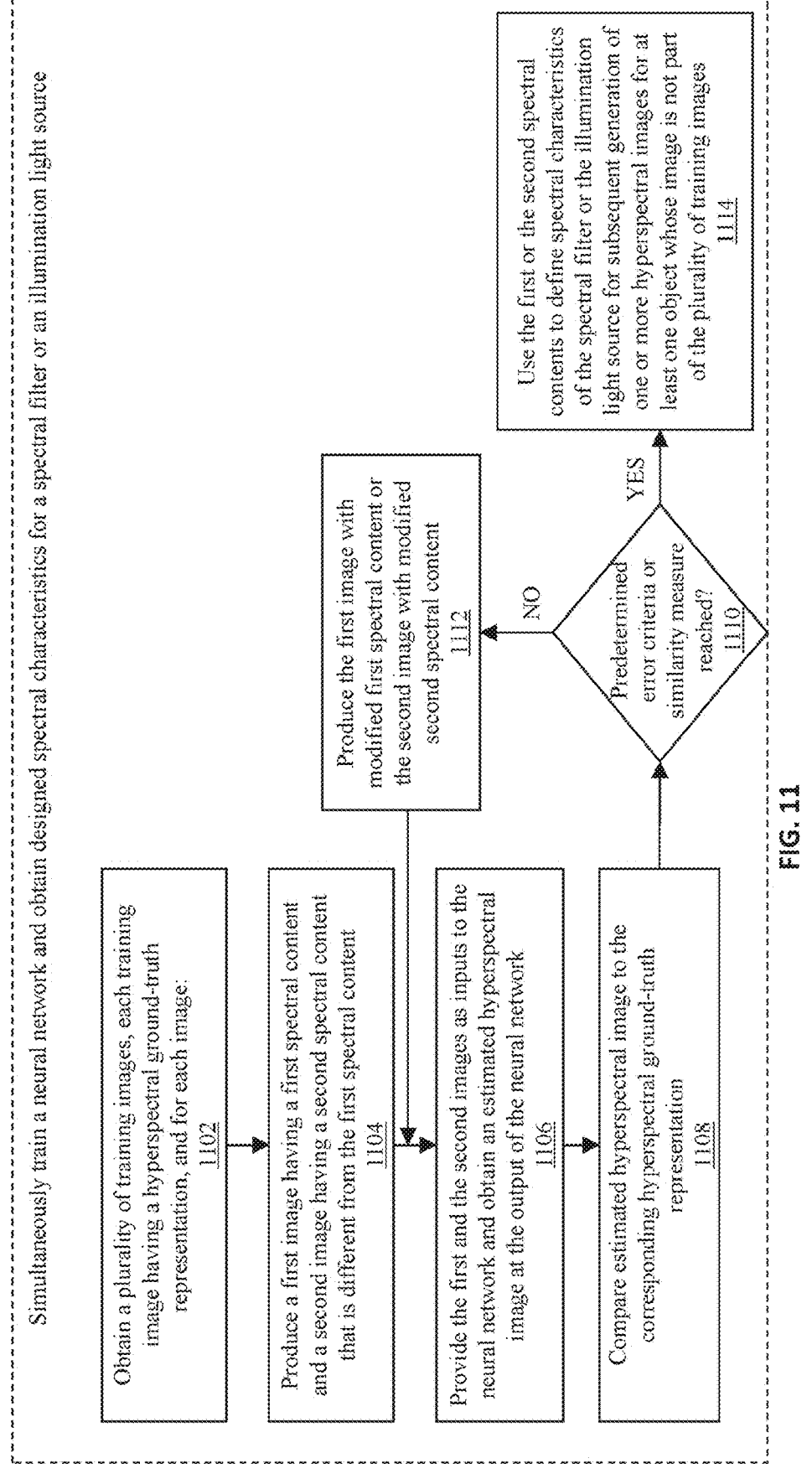
FIG. 11 illustrates a method that can be carried out produce hyperspectral images from a plurality of images in accordance with an example embodiment.

FIG. 11 illustrates a method that can be carried out produce hyperspectral images from a plurality of images in accordance with an example embodiment. The method includes a set of operations are performed to simultaneously train a neural network and obtain designed spectral characteristics for a spectral filter or an illumination light source. The set of operations include, at 1102, obtaining a plurality of training images, each training image having a hyperspectral ground-truth representation, and for each of the training images: producing, at 1104, a first image having a first spectral content and a second image having a second spectral content that is different from the first spectral content, providing, at 1106, the first and the second images as inputs to the neural network and obtaining an estimated hyperspectral image at the output of the neural network, comparing, at 1108, each estimated hyperspectral image to the corresponding hyperspectral ground-truth representation. At 1110, a determination is made whether a predetermined error criteria or similarity measure is reached. If the predetermined error criteria or similarity measure is not, reached ("NO" at 1110), the first image with modified first spectral content or the second image with modified second spectral content are produced at 1112, and operation 1106 and 1108 are repeated until the predetermined error criteria or similarity measure is reached. If the determination at 1110 indicates that the predetermined error criteria or similarity measure is reached ("YES"), which is also indicative of completion of training of the neural network, the first or the second spectral contents are used at 1114 to define spectral characteristics of the spectral filter or the illumination light source for subsequent generation of one or more hyperspectral images for at least one object whose image is not part of the plurality of training images.

In one example embodiment, the generation of the one or more spectral images for the at least one object comprises obtaining a first and a second image of the at least one object using an imaging device that includes one or more imaging lenses and one or more sensors, wherein the first and the second obtained images have different spectral contents that conform to the first and the second spectral contents, respectively; providing the first and the second obtained images as inputs to the neural network; and obtaining the one or more spectral images at the output of the neural network. In another example embodiment, the first obtained image is a red-green-blue (RGB) image without the spectral filter, and the second obtained image is obtained by using the spectral filter. In yet another example embodiment, obtaining the second image of the at least one object includes positioning the spectral filter in an imaging path of the imaging device. In still another example embodiment, obtaining the second image of the at least one object includes positioning the spectral filter in an illumination path of the imaging device.

According to another example embodiment, obtaining the first and the second image comprises using a controllable illumination source and performing at least the following operations: causing the controllable illumination source to produce a first output illumination to obtain the first image of the at least one object, and causing the controllable illumination source to produce a second output illumination having different spectral characteristics than the first output illumination to obtain the second image of the at least one object. In another example embodiment, the determination that the predetermined error criteria or similarity measure is reached or is not reached comprises determining whether or not a particular attribute associated with the error criteria or similarity measure is reached or surpassed. In one example embodiment, the particular attribute includes one or more of: a minimum value, a maximum value, or an inflection point. In another example, embodiment, the error criteria or similarity measure comprises a loss function.

Another aspect of the disclosed embodiments relates to a hyperspectral imaging device that includes one or more imaging lenses, one or more sensors positioned to receive light associated with an object from the one or more imaging lenses, and a spectral filter. The hyperspectral imaging device is configured to capture a first image produced without using the spectral filer and to capture a second image produced with the spectral filter. The first image and the second image have different spectral contents, and the first and the second images are provided to a processor configured to process information corresponding to the first and the second images using a trained neural network for producing hyperspectral imaging data associated with the first and second images.

In one example embodiment, the hyperspectral imaging device is operable to perform a training operation to configure the trained neural network, wherein the spectral filter has spectral characteristics that are obtained during the training operations that simultaneously configures the trained neural network, and wherein the spectral characteristics of the spectral filter are obtained based on minimization of an error value associated with a ground-truth image. In another example embodiment, the hyperspectral imaging data includes spectral information with 10 nm or less spectral granularity. In yet another example embodiment, the one or more sensors consists of a color sensor. In still another example embodiment, the one or more sensors include a color sensor and a monochrome sensor.

According to another example embodiment, the hyperspectral imaging device includes a movable stage to allow movement of the spectral filter for capturing the first or the second image. In yet another example embodiment, the spectral filter is positioned in an imaging path of the hyperspectral imaging device. In still another example embodiment, the spectral filter is positioned in front of the one or more imaging lenses. In one example embodiment, the hyperspectral imaging device includes two imaging lenses, wherein: the spectral filter is positioned only in front of one of the two imaging lenses to produce the second image while the other of the two imaging lenses is configured to produce the first image, and the hyperspectral imaging device is configured to capture the first and second images simultaneously. In one example embodiment, the one or more sensors consists of a single sensor positioned to capture the first image at one section and the second image at different section thereof. In still another example embodiment, the one or more sensors include a first sensor and a second sensor positioned to capture the first image and the second image, respectively.

In another example embodiment, the spectral filter is positioned in an illumination path of the hyperspectral imaging device between an illumination source and the object. In yet another example embodiment, the trained neural network includes a pairwise-image-based hyperspectral convolutional neural network. In still another example embodiment, the hyperspectral imaging device includes the processor and a memory with instruction stored therein, wherein the instructions upon execution by the processor cause the processor to process the first and the second images by the trained neural network to produce the hyperspectral imaging data.

Another aspect of the disclosed embodiments relates to a hyperspectral imaging device that includes an imaging lens, a sensor positioned to receive light associated with an object from the imaging lens, and an illumination source configurable to produce illumination with changeable spectral characteristics. The hyperspectral imaging device is configured to capture a first image of the object using a first illumination output from the illumination source, and to capture a second image of the object using a second illumination output from the illumination source. The first and second illumination outputs have different spectral characteristics, and the first and second images are provided to a processor configured to process information associated with the first and the second images using a trained neural network for producing hyperspectral imaging data associated with the first and second images.

In one example embodiment, the illumination source is one of: a tunable light source, an array of light sources configured to produce the changeable spectral characteristics via on-off control of the light sources in the array, an array of light sources configured to produce the changeable spectral characteristics via changing a drive current for one or more of the light sources, a movable or changeable set of filters positioned in front of a broadband light source, or a light source with a spatial light modulator, a digital mirror device or a liquid crystal light modulator. In another example embodiment, the illumination sources is one of: a laser or a light emitting diode (LED).

It is understood that the various disclosed embodiments may be implemented individually, or collectively, using devices comprised of various optical components, electronics hardware and/or software modules and components.

These devices, for example, may comprise a processor, a memory unit, an interface that are communicatively connected to each other, and may range from desktop and/or laptop computers, to mobile devices and the like. The processor and/or controller can perform various disclosed operations based on execution of program code that is stored on a storage medium. The processor and/or controller can, for example, be in communication with at least one memory and with at least one communication unit that enables the exchange of data and information, directly or indirectly, through the communication link with other entities, devices and networks. The communication unit may provide wired and/or wireless communication capabilities in accordance with one or more communication protocols, and therefore it may comprise the proper transmitter/receiver antennas, circuitry and ports, as well as the encoding/decoding capabilities that may be necessary for proper transmission and/or reception of data and other information. For example, the processor may be configured to receive electrical signals or information from the disclosed imaging sensors (e.g., CMOS sensors), to process the received information to produce images or other information of interest, or may be used to implement operations and components of the neural networks described herein.

Various information and data processing operations described herein may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media that is described in the present application comprises non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. While operations are depicted in the drawings in a particular order, this should not be understood as requiring that such operations be performed in the particular order shown or in sequential order, or that all illustrated operations be performed, to achieve desirable results. The features of the embodiments described herein may be combined in all possible combinations of methods, apparatus, modules, and systems.

The invention claimed is:

1. A hyperspectral imaging device, comprising:
one or more imaging lenses,
one or more sensors positioned to receive light associated with an object from the one or more imaging lenses, and
a spectral filter, wherein:
the hyperspectral imaging device is configured to capture a first image produced without using the spectral filter and to capture a second image produced with the spectral filter,
the first image and the second image have different spectral contents,
one of the first image or the second image is an RGB image, and other one of the first or the second image is an RGB image or a monochrome image, and
the first and the second images are provided to a processor configured to process information corresponding to the first and the second images using a trained neural network for producing hyperspectral imaging data associated with the first and second images.

2. The hyperspectral imaging device of claim 1, wherein the hyperspectral imaging device is operable to perform a training operation to configure the trained neural network, wherein the spectral filter has spectral characteristics that are obtained during the training operation that simultaneously configures the trained neural network, and wherein the spectral characteristics of the spectral filter are obtained based on minimization of an error value associated with a ground-truth image.

3. The hyperspectral imaging device of claim 1, wherein the hyperspectral imaging data includes spectral information with 10 nm or less spectral granularity.

4. The hyperspectral imaging device of claim 1, wherein the one or more sensors consists of a color sensor.

5. The hyperspectral imaging device of claim 1, wherein the one or more sensors include a color sensor and a monochrome sensor.

6. The hyperspectral imaging device of claim 1, including a movable stage to allow movement of the spectral filter for capturing the first or the second image.

7. The hyperspectral imaging device of claim 1, wherein the spectral filter is positioned in an imaging path of the hyperspectral imaging device.

8. The hyperspectral imaging device of claim 7, wherein the spectral filter is positioned in front of the one or more imaging lenses.

9. The hyperspectral imaging device of claim 1, comprising two imaging lenses, wherein:
the spectral filter is positioned only in front of one of the two imaging lenses to produce the second image while the other of the two imaging lenses is configured to produce the first image, and
the hyperspectral imaging device is configured to capture the first and second images simultaneously.

10. The hyperspectral imaging device of claim 9, wherein the one or more sensors consists of a single sensor positioned to capture the first image in one section and the second image at different section thereof.

11. The hyperspectral imaging device of claim 9, wherein the one or more sensors include a first sensor and a second sensor positioned to capture the first image and the second image, respectively.

12. A hyperspectral imaging device, comprising:
one or more imaging lenses,
one or more sensors positioned to receive light associated with an object from the one or more imaging lenses, and
a spectral filter, wherein:
the hyperspectral imaging device is configured to capture a first image produced without using the spectral filter and to capture a second image produced with the spectral filter,
the first image and the second image have different spectral contents,
the first and the second images are provided to a processor configured to process information corresponding to the first and the second images using a trained neural network for producing hyperspectral imaging data associated with the first and second images, and
the spectral filter is positioned in an illumination path of the hyperspectral imaging device between an illumination source and the object.

13. The hyperspectral imaging device of claim 1, wherein the trained neural network includes a pairwise-image-based hyperspectral convolutional neural network.

14. The hyperspectral imaging device of claim 1, wherein the hyperspectral imaging device includes the processor and a memory with instructions stored therein, wherein the instructions upon execution by the processor cause the processor to process the first and the second images by the trained neural network to produce the hyperspectral imaging data.

15. A hyperspectral imaging device, comprising:
an imaging lens,
a sensor positioned to receive light associated with an object from the imaging lens, and
an illumination source configurable to produce illumination with changeable spectral characteristics, wherein:
the hyperspectral imaging device is configured to capture a first image of the object using a first illumination output from the illumination source, and to capture a second image of the object using a second illumination output from the illumination source,
the first and second illumination outputs have different spectral characteristics, and
the first and second images are provided to a processor configured to process information associated with the first and the second images using a trained neural network for producing hyperspectral imaging data associated with the first and second images.

16. The hyperspectral imaging device of claim 15, wherein the illumination source is one of:
a tunable light source,
an array of light sources configured to produce the changeable spectral characteristics via on-off control of the light sources in the array,
an array of light sources configured to produce the changeable spectral characteristics via changing a drive current for one or more of the light sources,
a movable or changeable set of filters positioned in front of a broadband light source, or
a light source with a spatial light modulator, a digital mirror device or a liquid crystal light modulator.

17. The hyperspectral imaging device of claim 15, wherein the illumination sources is one of: a laser or a light emitting diode (LED).

18. A method for producing hyperspectral images from a plurality of images, the method comprising:
performing a set of operations to simultaneously train a neural network and obtain designed spectral characteristics for a spectral filter or an illumination light source, the set of operations including:

obtaining a plurality of training images, each training image having a hyperspectral ground-truth representation, and for each of the training images:

(a) producing a first image having a first spectral content and a second image having a second spectral content that is different from the first spectral content, (b) providing the first and the second images as inputs to the neural network and obtaining an estimated hyperspectral image at an output of the neural network, comparing each estimated hyperspectral image to the corresponding hyperspectral ground-truth representation, upon a determination that a predetermined error criteria or similarity measure is not reached, producing the first image with modified first spectral content or the second image with modified second spectral content and repeating operation (b) and the comparing until the predetermined error criteria or the similarity measure is reached, and upon reaching the predetermined error criteria or the similarity measure, which is also indicative of completion of training of the neural network, using the first or the second spectral contents of the first or the second images to define spectral characteristics of the spectral filter or the illumination light source for subsequent generation of one or more hyperspectral images for at least one object whose image is not part of the plurality of training images.

19. The method of claim 18, wherein the generation of the one or more hyperspectral images for the at least one object comprises:

obtaining a first and a second image of the at least one object using an imaging device that includes one or more imaging lenses and one or more sensors, wherein the first and the second obtained images have different spectral contents that conform to the first and the second spectral contents, respectively;

providing the first and the second obtained images as inputs to the neural network; and obtaining the one or more spectral images at the output of the neural network.

20. The method of claim 19, wherein:

the imaging device include the spectral filter, the first obtained image is a red-green-blue (RGB) image without the spectral filter, and the second obtained image is obtained by using the spectral filter.

21. The method of claim 20, wherein obtaining the second image of the at least one object includes positioning the spectral filter in an imaging path of the imaging device.

22. The method of claim 20, wherein obtaining the second image of the at least one object includes positioning the spectral filter in an illumination path of the imaging device.

23. The method of claim 19, wherein:

obtaining the first and the second image comprises using a controllable illumination source and performing at least the following operations:

causing the controllable illumination source to produce a first output illumination to obtain the first image of the at least one object, and causing the controllable illumination source to produce a second output illumination having different spectral characteristics than the first output illumination to obtain the second image of the at least one object.

24. The method of claim 18, wherein the determination that the predetermined error criteria or similarity measure is reached or is not reached comprises determining whether or not a particular attribute associated with the predetermined error criteria or the similarity measure is reached or surpassed.

25. The method of claim 24, wherein the particular attribute includes one or more of:

a minimum value, a maximum value, or an inflection point.

26. The method of claim 18, wherein the error criteria or the similarity measure comprises a loss function.

* * * * *